United States Patent
Tidwell et al.

(10) Patent No.: US 6,999,561 B2
(45) Date of Patent: Feb. 14, 2006

(54) METHOD OF DETECTING REMOTE GROUND CONDITION

(75) Inventors: Bradley Dwayne Tidwell, Harvest, AL (US); Steven M. Robinson, Madison, AL (US); James Michael Hawkins, Albertville, AL (US)

(73) Assignee: Adtran Inc., Huntsville, AL (US)

( * ) Notice: Subject to any disclaimer, the term of this patent is extended or adjusted under 35 U.S.C. 154(b) by 212 days.

(21) Appl. No.: 10/403,308

(22) Filed: Mar. 31, 2003

(65) Prior Publication Data

US 2004/0190686 A1 Sep. 30, 2004

(51) Int. Cl.
  *H04M 1/24* (2006.01)
  *H04M 3/08* (2006.01)
  *H04M 3/22* (2006.01)
  *H02H 3/00* (2006.01)

(52) U.S. Cl. ............... 379/22.03; 379/22.04; 379/27.05; 379/29.01; 361/42

(58) Field of Classification Search ............. 379/1.01, 379/22, 22.03, 22.04, 24, 27.01, 27.05, 29.01, 379/29.04, 32.02; 361/42, 62, 63, 65; 324/500, 324/509; 340/649, 650, 3.43, 292; 702/58, 702/59
See application file for complete search history.

(56) References Cited

U.S. PATENT DOCUMENTS

| | | | | |
|---|---|---|---|---|
| 4,197,435 A | * | 4/1980 | Jackson et al. | 379/2 |
| 4,385,336 A | * | 5/1983 | Takeshita et al. | 379/29.03 |
| 5,113,426 A | * | 5/1992 | Kinoshita et al. | 379/33 |
| 5,390,231 A | * | 2/1995 | Hung et al. | 379/2 |
| 5,400,203 A | * | 3/1995 | Tice | 361/62 |
| 5,774,316 A | | 6/1998 | McGary et al. | 361/42 |
| 5,808,470 A | * | 9/1998 | Adams et al. | 324/510 |
| 5,862,200 A | * | 1/1999 | Sheets | 379/22.03 |
| 6,292,541 B1 | * | 9/2001 | Tice et al. | 379/22.03 |
| 6,757,382 B1 | * | 6/2004 | Wilkes, Jr. et al. | 379/399.01 |
| 6,927,954 B1 | * | 8/2005 | Boudreaux et al. | 361/42 |

* cited by examiner

*Primary Examiner*—Quoc Tran
(74) *Attorney, Agent, or Firm*—Allen, Dyer, Doppelt Milbradt & Gilchrist, P.A.

(57) ABSTRACT

Whether or not protection circuitry for a span-powered remote digital subscriber loop unit is properly connected to earth ground is determined by the deliberate assertion and detection of a ground fault from a central office line card location. The span-powered remote unit is augmented to place a controllable conduction path in circuit with the span-powered loop and an earth ground pin. If the earth ground pin has been properly connected to earth ground, applying the conductive path will place a ground fault on the span, which is detected by a ground fault detector within the central office line card. If the ground fault detector does not detect a ground fault in response to the application of the conductive path, the line card forwards a negative ground fault event message to a test center, so that a service technician may be dispatched to the remote unit to correct the problem.

10 Claims, 2 Drawing Sheets

METHOD OF DETECTING REMOTE GROUND CONDITION

FIELD OF THE INVENTION

The present invention relates in general to telecommunication systems, and is particularly directed to a method for determining the proper connection to earth ground of electrical anomaly (e.g., surge) protection circuitry for remote equipment, such as, but not limited to span-powered digital subscriber loop circuitry, through the deliberate assertion and detection of a ground fault from a central office line card location.

BACKGROUND OF THE INVENTION

In addition to transporting audio (voice), video and/or data signals over (copper wire) telephone lines, certain types of telecommunication equipment employ the same conductive pair to remotely power one or more circuits, such as midspan repeaters and terminating devices, that are connected across the line pair. This method of remote line powering is commonly termed loop- or span-powering and is used extensively in digital subscriber loop (DSL) networks, such as DDS, ISDN, T1 and HDSL networks. In order to protect its electronics from damage due to surges from lightning or power fault events, it is common practice for the remote device to contain surge protection circuitry, which is operative to divert such surges to earth ground. As operation of the DSL circuitry, per se, does not require a connection to earth ground, the installer of the equipment may fail to provide a connection to earth ground, thereby rendering the surge protection circuitry ineffective. Thus, there is a need for an effective technique to determine whether or not an earth ground connection has been properly established, and to provide an indication of the same to a central maintenance and test center, in order to assist a loop exchange carrier in ensuring that the DSL equipment has been properly installed.

SUMMARY OF THE INVENTION

In accordance with the present invention, this objective is successfully achieved by taking advantage of ground fault detection circuitry installed at a line card in the central office end of the span to monitor a controllably initiated ground fault test condition at the remote equipment. For this purpose, the remote DSL unit is augmented to place a selectively operable conduction path in circuit with the span-powered loop and an earth ground pin, through which surge protection circuitry of the remote unit is connected to earth ground. As pointed out above, the installer of the remote unit may fail to properly connect the earth ground pin to earth ground; the invention serves to detect if this is the case.

To this end, after the remote DSL circuit has been initialized and is receiving power over the span, the test center issues a command to the central office line card to initiate a remote ground determination test. In response to this command, the communications controller within the central office line card uses the embedded operations channel to transmit a command to apply a conductive path from the span to the earth ground pin of the remote unit, so as to cause a ground fault at the remote terminal. If the earth ground pin has been properly connected to earth ground by installation personnel, application of the conductive path in the remote terminal will place a ground fault on the span, which is detected by the ground fault detector within the central office line card.

In response to the ground fault, the application of the supply voltage to the loop is interrupted, powering off the remote unit, thereby removing the ground fault from the span. The line card also forwards to the test center a positive ground detection message—confirming that ground has been successfully detected at the remote unit. The central office line card then reapplies power to the loop, so that the remote unit can resume normal operation.

On the other hand, if the ground fault detector within the central office line card does not detect a ground fault in response to the application of the conductive path, a command is issued to the remote unit to remove the conductive path. In addition, the line card forwards a negative ground detection message to the test center, so that the appropriate servicing technician may be dispatched to the remote unit to correct the problem.

DETAILED DESCRIPTION

Figure 1:
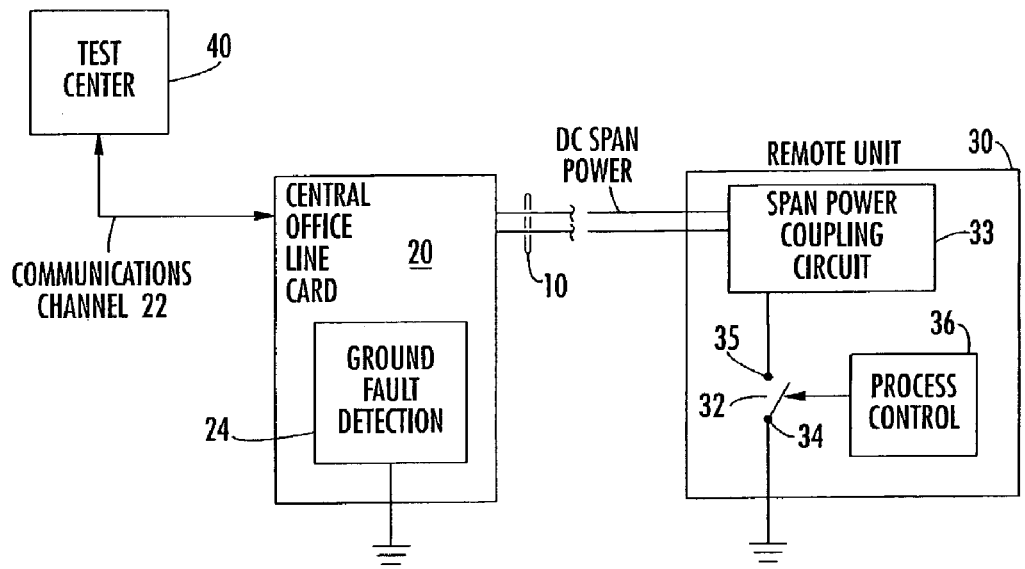
FIG. 1 diagrammatically illustrates the ground fault assertion and detection system in accordance with the present invention.

Before describing in detail the new and improved remote ground assertion and detection methodology in accordance with the present invention, it should be observed that the invention resides primarily in what is effectively a prescribed arrangement of conventional communication circuits and components, as well as a test sequence therefor. Thus, the configuration of such circuits and components and the manner in which they are interfaced with other communication system equipment have, for the most part, been illustrated in the drawings in readily understandable block diagram and flow chart format, so as to show only those specific details that are pertinent to the present invention, and not to obscure the disclosure with details which will be readily apparent to those skilled in the art having the benefit of the description herein, and are primarily intended to show the major components of the system in a convenient functional grouping, so that the present invention may be more readily understood.

Attention is initially directed to FIG. 1, which diagrammatically illustrates a ground fault assertion and detection system in accordance with the present invention. As shown therein a telecommunication link (twisted copper pair) 10 is terminated at 'west' end thereof by a central office-installed line card 20, and at the 'east' end thereof by a remote DSL unit 30. In addition to being coupled to a communications channel 22, through which it communicates with an associated maintenance and test center 40, the central office line card 20 contains a ground fault detection unit 24. Ground fault detection unit 24, which is coupled to the span 10, is preferably of the type described in the U.S. Pat. No. 5,774,316, to McGary et al, entitled: "Ground Fault Detector for Line-Powered Telephone Network," assigned to the assignee of the present application and the disclosure of which is incorporated herein.

Pursuant to the invention, the circuitry of the remote DSL unit 30 is augmented to include a selectively operable conductive path 32, which is coupled in circuit with an earth ground pin 34 and the powered-loop 10, which is terminated by a span power coupling circuit 33. It is through the earth ground pin 34 that the surge protection circuitry within the remote unit is connected to earth ground. Occasionally, however, as pointed out above, the installer of the remote unit will fail to properly connect the earth ground pin 34 to earth ground (such as by not connecting it to anything, or by connecting it to a chassis frame ground (which may not necessarily be connected to earth ground)). Operation of the conductive path 32 is controlled via a communications controller 36 within the remote unit.

Figure 2:
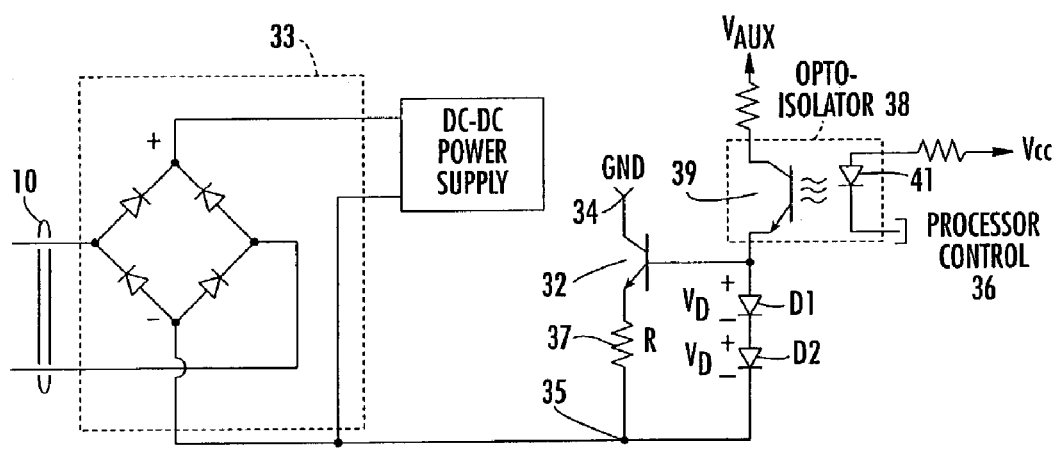
FIG. 2 is a circuit diagram of a preferred embodiment of the ground conduction path.

A preferred but non-limiting embodiment of the selectively controlled ground conduction path 32 is illustrated in the circuit diagram of FIG. 2. As shown therein, the central office-powered loop/span 10 is coupled to a full wave rectifier circuit 33, which serves as a span powering circuit for a DC-DC power supply of the remote unit 30. The selectively controlled conduction path 32 is shown as comprising an NPN transistor having its collector coupled to the ground pin 34 and its emitter coupled through a resistor 37 to a node 35, which is coupled to the span power coupling circuit 33. The base of the NPN transistor is coupled to the emitter of an output transistor 39 of an opto-isolator 38, and to a pair of diodes D1 and D2, which are referenced to node 35. The collector of the opto-isolator transistor 39 is resistor-coupled to a reference voltage Vaux, as shown. The light-emitting diode 41 portion of the opto-isolator 38 is resistor-coupled between Vcc and a control signal from the controller 36. In response to a turn-on signal from the controller 36, the opto-isolator's output transistor 39 turns on; this operation, in turn, forward biases and turns on the conduction path transistor 32, so as to provide a conduction path between nodes 34 and 35 via resistor 37. If ground is connected, the current in the conduction path between nodes 34 and 35 is given approximately by Vd/R. Vd is the value of the voltage drops across D1 and D2. In the absence of a turn-on signal from controller 36, the opto-isolator provides no turn-on base current to conduction path transistor 32, so that the conduction path circuit between nodes 34 and 35 is interrupted.

Figure 3:
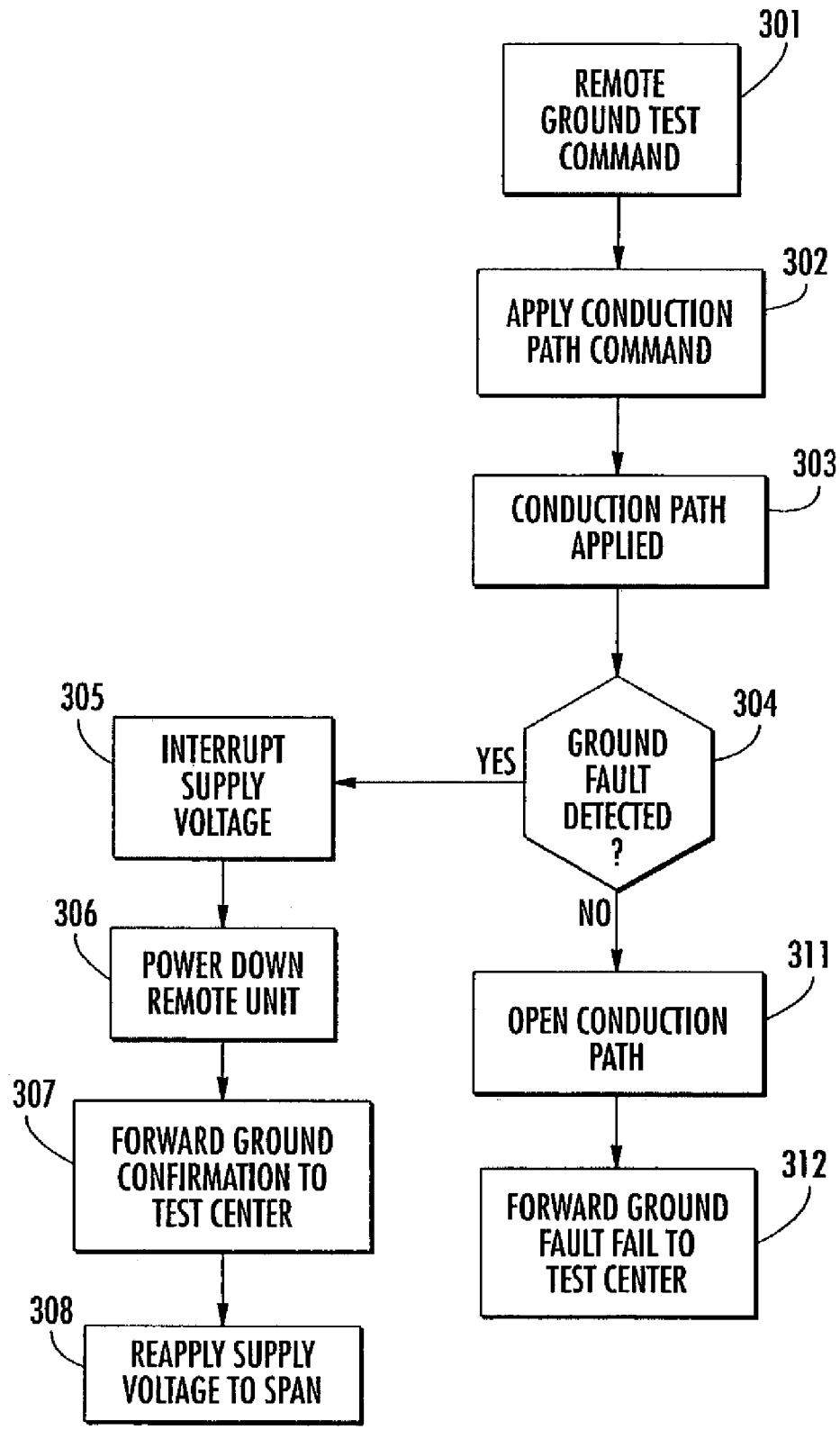
FIG. 3 is a flow chart showing the steps of the earth ground determination methodology of the present invention.

The remote ground determination in accordance with the methodology of the present invention is shown in the flow chart of FIG. 3. Prior to execution of the steps of the remote ground determination process, the remote DSL circuit will have been initialized, with power for the remote unit being supplied over the span. At step 301 the central test center issues a command over the communications channel 22 to the line card within the central office to initiate a remote ground determination test. In response to this command, the communications controller within the central office line card uses the embedded operations channel (EOC) of the DSL circuit to transmit a command at step 302 to the remote unit 30 to apply the conduction path 32, thereby ostensibly deliberately asserting a ground fault at the remote terminal.

At step 303, the remote unit's control processor applies the conduction path 32. In response to step 303, ground fault event query step 304 is performed. If the earth ground pin has been properly connected to earth ground by installation personnel, closing the conduction path 32 will place a ground fault on the span 10. In response to this event (the answer to query step 304 is YES), the ground fault detector 24 within the central office line card will detect current flow to ground (a ground fault) and will interrupt the application of the supply voltage to the loop 10 in step 305 resulting in the remote unit powering down in step 306. In step 307, the line card notes the deliberately asserted ground fault event as confirmation that a ground fault has been successfully detected at the remote unit, and forwards a positive ground detect message to the test center. The supply voltage is then reapplied to the span in step 308.

If, on the other hand, the answer to query step 304 is NO, indicating that the ground fault detector 24 within the central office line card did not detect a ground fault as a response to the application of the conductive path in step 203, as desired, a command is issued to the remote unit in step 311 to open the conductive path 32. Next, in step 312, the line card notes the absence of a ground fault event as an indication that a ground fault has not been successfully applied at the remote unit, and forwards a negative ground detect message to the test center. This information is then used to dispatch the appropriate servicing technician to the remote unit to correct the problem.

As will be appreciated from the foregoing description, the need to confirm that an earth ground connection has been properly established for surge protection circuitry at a remote terminal is readily successfully achieved in accordance with the present invention, by taking advantage of ground fault detection circuitry installed at a central office line card to monitor a controllably initiated ground fault test condition at the remote equipment. If the earth ground pin has been properly connected to earth ground, applying the conductive path will trigger a ground fault, and the test center is advised that the remote unit is properly grounded. If a ground fault is not detected in response to the application of the conductive path, a negative ground fault event message is transmitted to the test center, so that a servicing technician may be dispatched to the remote unit to correct the problem.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method for determining at a central office site, whether or not protection circuitry for a remote span-powered telecommunication unit is properly grounded comprising the steps of:
   (a) providing, at said remote span-powered telecommunication unit, a controlled conduction path that is operative to deliberately couple, to earth ground, said protection circuitry for said remote span-powered telecommunication unit, which protection circuit must be connected to earth ground to ensure the successful operation of said protection circuit for protecting said remote span-powered telecommunication unit against electrical anomalies;
   (b) from said central office site, selectively applying said controlled conduction path and monitoring said span for the occurrence of a ground fault;
   c) in response to detecting a ground fault as a result of application of said controlled conduction path, generating an output indicating that said protection circuit for said remote span-powered telecommunication unit is properly grounded thereby ensuring that said protection circuit is able to divert said electrical anomalies to earth ground and thereby protect said span-powered telecommunication unit.

2. The method according to claim 1, wherein step (c) further includes reapplying span voltage to resume normal operation.

3. The method according to claim 1, wherein step (c) comprises, in response to failing to detect a ground fault as a result of application of said controlled conduction path, generating an output indicating that said protection circuit for said remote span-powered telecommunication unit may not be properly grounded.

4. The method according to claim 3, wherein step (c) further includes transmitting a message to said telecommunication unit to open said controlled conductive path.

5. A method for determining at a central office site, whether or not a protection circuit for a span-powered remote telecommunication unit is properly grounded, wherein said protection circuit must be connected to earth ground to ensure the successful operation of said protection circuit for protecting said span-powered remote telecommunication unit against electrical anomalies, said method comprising the steps of:

(a) transmitting a message from said central office to said remote telecommunication unit, said message causing said remote telecommunication unit to deliberately assert a ground fault on said span if said protection circuit for said remote telecommunication unit has a node thereof properly grounded to earth ground, so as to ensure the successful operation of said protection circuit of diverting said electrical anomalies to earth ground and thereby protecting said span-powered remote telecommunication unit, but to fail to assert a ground fault on said span if said remote telecommunication unit is not properly grounded;

(b) in response to detecting a ground fault as a result of transmission of said message to said remote telecommunication unit, generating an output indicating that said protection circuit for said remote span-powered telecommunication unit is properly grounded, thereby ensuring that said protection circuit is able to divert said electrical anomalies to earth ground and thereby protect said span-powered remote telecommunication unit, but in response to failing to detect a ground fault as a result of transmission of said message to said remote telecommunication unit, generating an output indicating that said protection circuit for said remote span-powered telecommunication unit is not properly grounded, so that said protection circuit is not able to divert said electrical anomalies to earth ground and is thereby unable to protect said span-powered remote telecommunication unit.

6. The method according to claim 5, wherein step (b) further includes interrupting the application of power to said span.

7. The method according to claim 5, wherein step (b) further includes transmitting a message to said telecommunication unit to terminate a condition through which said ground fault was to be asserted, in response to failing to detect a ground fault as a result of transmission of said message to said remote telecommunication unit.

8. A system for determining whether or not a protection circuit for a span-powered remote telecommunication unit is properly grounded comprising:

at said span-powered remote telecommunication unit, a conduction path which is controllably operative to deliberately couple, to earth ground, said protection circuit for said span-powered remote telecommunication unit, said protection circuit having to be connected to earth ground to ensure the successful operation of said protection circuit for protecting said span-powered remote telecommunication unit against electrical anomalies; and at a central office site, an embedded control system which is operative to transmit a message via an embedded operations channel to cause said protection circuit for said remote telecommunication unit to selectively apply said conduction path, and a ground fault detector which is operative to monitor said span for the occurrence of a ground fault and, in response to detecting a ground fault as a result of applying said conductive path, to generate an output indicating that said protection circuit for said span-powered remote telecommunication unit has a ground connection, and is thereby able to divert said electrical anomalies to earth ground and thereby protect said span-powered remote telecommunication unit.

9. The system according to claim 8, wherein said ground fault detector and said embedded control system are operative to interrupt application of power to said span.

10. The system according to claim 8, wherein said embedded control system is operative, in response to said ground fault detector failing to detect a ground fault as a result of application of said conductive path, to generate an output indicating that said protection circuitry for said remote span-powered telecommunication unit is not properly grounded, and commanding said remote telecommunication unit to remove said conductive path.

* * * * *